(12) United States Patent
Kirsch

(10) Patent No.: US 7,031,954 B1
(45) Date of Patent: Apr. 18, 2006

(54) DOCUMENT RETRIEVAL SYSTEM WITH ACCESS CONTROL

(75) Inventor: Steven T. Kirsch, Los Altos, CA (US)

(73) Assignee: Google, Inc., Mountain View, CA (US)

( * ) Notice: Subject to any disclaimer, the term of this patent is extended or adjusted under 35 U.S.C. 154(b) by 1402 days.

(21) Appl. No.: 08/927,022

(22) Filed: Sep. 10, 1997

(51) Int. Cl.
G06F 17/30 (2006.01)

(52) U.S. Cl. .................. 707/3; 707/4; 707/9

(58) Field of Classification Search .......... 707/10, 707/2, 6, 9, 101, 104.1, 516, 105, 4, 3; 395/200, 395/33, 3; 709/217, 225, 229, 203, 224, 709/245, 910; 703/201; 345/333; 705/9; 380/21; 711/202
See application file for complete search history.

(56) References Cited

U.S. PATENT DOCUMENTS

| | | | | |
|---|---|---|---|---|
| 5,012,808 A | * | 5/1991 | Stubbers et al. | 607/58 |
| 5,335,346 A | | 8/1994 | Fabbio | 711/163 |
| 5,678,041 A | * | 10/1997 | Baker et al. | 707/9 |
| 5,701,458 A | * | 12/1997 | Bsaibes et al. | 707/9 |
| 5,706,507 A | * | 1/1998 | Schloss | 707/104 |
| 5,721,908 A | * | 2/1998 | Lagarde et al. | 707/10 |
| 5,751,956 A | * | 5/1998 | Kirsch | 395/200.33 |
| 5,761,673 A | * | 6/1998 | Bookman et al. | 707/104 |
| 5,771,379 A | * | 6/1998 | Gore, Jr. | 707/101 |
| 5,778,368 A | * | 7/1998 | Hogan et al. | 707/10 |
| 5,784,564 A | * | 7/1998 | Camaisa et al. | 709/224 |
| 5,794,230 A | * | 8/1998 | Horadan et al. | 707/2 |
| 5,802,518 A | * | 9/1998 | Karaev et al. | 707/9 |
| 5,813,006 A | * | 9/1998 | Polnerow et al. | 707/10 |
| 5,835,712 A | * | 11/1998 | DuFresne | 709/203 |
| 5,845,067 A | * | 12/1998 | Porter et al. | 713/200 |
| 5,862,325 A | | 1/1999 | Reed et al. | 395/200.31 |
| 5,864,871 A | * | 1/1999 | Kitain et al. | 707/104 |
| 5,889,958 A | * | 3/1999 | Willens | 709/229 |
| 5,918,228 A | * | 6/1999 | Rich et al. | 707/10 |
| 5,918,232 A | * | 6/1999 | Pouschine et al. | 707/103 |
| 5,923,756 A | * | 7/1999 | Shambroom | 380/21 |

(Continued)

OTHER PUBLICATIONS

"Netscape's Big Enterprise Push", Network Computing, pp. 38, May 1997.*

(Continued)

Primary Examiner—Jeffrey Gaffin
Assistant Examiner—Neveen Abel-Jalil
(74) Attorney, Agent, or Firm—Fenwick & West LLP

(57) ABSTRACT

An electonic document retrieval system and method for a collection of information distributed over a network having documents stored in web or document servers in which an access control list relates user identification to documents to which a user has access. No access control lists are contained in the documents themselves nor are comparisons made between lists of users, with their access levels, and the classifications of documents. Rather, by the use of URLs or pointers, it is possible to associate every document to which a user has access with the user identification number or code. URLs have a hierchical format which allows partial URLs to indicate levels of access. HTTP protocol, FTP and CGI protocol employ URL calls for documents and can use the access control method and system of the present invention. When a search query is applied to a query server, a list of hits is returned, together with pertinent URLs. The query server consults each access control list associated with each document server, to present to the user only those URLs for which he has a proper access level. Other URLs for which the user does not have proper access are kept hidden from the user.

16 Claims, 1 Drawing Sheet

U.S. PATENT DOCUMENTS

| | | | | |
|---|---|---|---|---|
| 5,930,801 | A | * | 7/1999 | Falkenhainer et al. ...... 707/103 |
| 5,931,906 | A | * | 8/1999 | Fidelibus et al. ........... 709/217 |
| 5,940,843 | A | * | 8/1999 | Zucnovich et al. ......... 707/516 |
| 5,950,195 | A | * | 9/1999 | Stockwell et al. ............. 707/4 |
| 5,961,645 | A | * | 10/1999 | Baker .......................... 713/201 |
| 5,983,216 | A | * | 11/1999 | Kirsch et al. ................... 707/2 |
| 5,987,611 | A | * | 11/1999 | Freund ....................... 713/201 |
| 5,996,011 | A | * | 11/1999 | Humes ....................... 709/225 |
| 6,018,733 | A | * | 1/2000 | Kirsch et al. ................... 707/3 |
| 6,026,474 | A | * | 2/2000 | Carter et al. ................ 711/202 |
| 6,037,934 | A | * | 3/2000 | Himmel et al. ............. 345/335 |
| 6,041,360 | A | * | 3/2000 | Himmel et al. ............. 709/245 |
| 6,064,977 | A | * | 5/2000 | Haverstock et al. ........... 705/9 |

OTHER PUBLICATIONS

"Internet Firms Chase Parental Control", Digital Kids Report, No. 6, Jul. 1995.*

T. Winkler-Parenty, "The SYBASE Secure SQL Server", Proceedings of COMSPEC International 1990, pp. 61-70, Elsevier Adv. Tech. Oxford, U.K.

* cited by examiner

DOCUMENT RETRIEVAL SYSTEM WITH ACCESS CONTROL

TECHNICAL FIELD

The invention relates to electronic document retrieval and in particular to access control for documents available on storage devices located remotely from each other.

BACKGROUND ART

In communication networks, document servers, i.e. electronic document storage devices such as large disk drives, are frequently located remotely from each other. In large companies, with plants and offices scattered in many different cities, a computer network is often designed to link all or most locations. The network frequently includes a search engine or query server having an index of every word in every document which is selected for electronic availability, together with indexes for every word of such documents, and with pointers identifying the full document and its server where it may be accessed by an address known as a URL. Users with terminals on the network can address the query server with questions phrased in terms of key words and obtain documents which contain the key words. The questions are usually phrased or interpreted by the query server with query operators. The index at the query server is consulted to determine if the keywords are in the index, how many times they appear, and the number of documents which are responsive to the question, as interpreted by the search engine at the query server. However, a user is not given access to those documents which are beyond his or her access level.

In the prior art, the query server contained one list having the access level of each user. The index at the query server contained the access level associated with each corresponding document. Access was provided only to those documents for which the access level of the user was appropriate by matching the two lists. The problem here was that the query server had to associate a security level with each document in the index, a cumbersome storage task. In the simplest case, a user is either given permission to search the database, or access is denied, with no middle ground.

Variations of the above approach exist, but in most instances there is a comparison of two lists—the user list, with associated access levels, and the document list, with associated access levels. The document list contains the access level for each appearance of each document in the index. An object of the invention was to devise an access control system which enables secure searching without having to store any access information in the database associated with the search engine.

A further object of the invention is to allow changes in a document server's access control list to be immediately reflected in searches of documents within that document server.

A still further object of the invention is to allow a single centralized index of multiple document servers to be created, whereby searches of this central collection will only return titles of documents that a user has access to, with access control being determined at the remote document servers which contain relevant documents.

SUMMARY OF THE INVENTION

The above object is achieved with a document retrieval system, with access control, in which the documents are stored in a distributed manner over a plurality of servers in a network, termed "web servers", but no access levels are associated with the documents or with the index at a query server. Instead of multiple control lists, a user enters, either manually or automatically, his or her user identification, together with the query to be searched. The search engine at the query server receives the question and interprets the query operators to determine the number of hits responsive to the question. Each hit is associated with a document, in electronic form, located at a particular server by means of a pointer, known as a URL. However, before the hits are returned to the user, the hits are "screened" by determining from the web server whether the user has access using an access control list associated with the web server. The list associates user identification with URLs to which the user may have access.

The search engine will not report the presence of the documents for which the access level is insufficient. The web server returns documents for which the access level is compatible. Hence, the net result is that the user appears only to be able to search documents that the user has access to.

An advantage of the present invention is that the security of each document is always consistent between the web server and the search index.

BEST MODE FOR CARRYING OUT THE INVENTION

Figure 1:
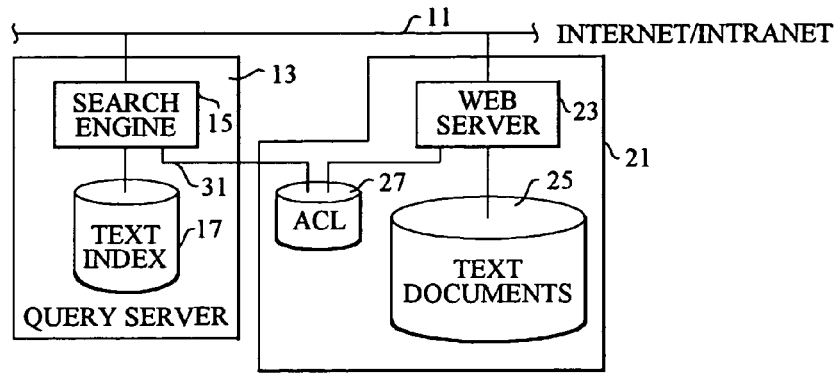
FIG. 1 is a plan view of the document retrieval and access control system of the present invention.

With reference to FIG. 1, a communications network, such as the Internet or a corporate intranet is indicated by the data bus line 11, a high speed conduit for digital data. Part of the network includes a query server 13 which is seen to comprise a search engine 15 which is connected to the text index database 17. The search engine is a high speed processor connected to the network by communications link 11. The search engine has the task of going to each document address in the network, known as a URL, combing through each document associated with the URL and indexing such words in a text index 17. A "URL" is an address or pointer to a document, or a file, or a record in a database, in other words to a piece of information which has been stored at a site known as a web server 23. The initials URL are an abbreviation for "uniform resource locator", recognized by Internet and intranet servers.

The URL is a string of ASCII characters with three common parts, a protocol indicator, a host server name, and a directory and file name, assuming that a file is the search target. An example would be http://federalexec.justice.gov/fbi/agents/cellular/pagers.html. In the example, the protocol is "http" which is hypertext transfer protocol, a common protocol which allows linking of files. The host server is "federalexec.justice.gov/fbi/. The document and its directory is "fbi/agents/cellular/pagers.html. The present invention takes advantage of the hierarchical structure of URLs by allowing access to all items of information specified in the initial portions of the URL for each user, i.e. a partial URL. The more detail specified in a URL, the lower the level of access. For example, the access level associated with http://federalexec.justice.gov/fbi/ might allow access to all files and data in the fbi server, while the further specification of "/agents" would further specify a level of access. In the present invention, a list of users would have each user associated with URLs, or partial URLs which that user could access. The http protocol is particularly useful because it works with "browsers", i.e. software programs which allow the formatting of documents in a uniform manner which can be read by any computer or terminal which can run the browser software. Thus, a terminal or computer need not have access to the word processing program in which the document was prepared. Perhaps the best known feature of http protocol is the "hyperlink" feature, allowing a user to jump from a word or symbol in one document to another URL which expands upon the word or symbol. Another type of protocol which is commonly used is "ftp" or "fle transfer protocol". This allows direct access to computer files on designated servers and is not necessarily oriented to documents with hyperlinks, like http protocol.

A text index at a query server, lists the words found in documents accessible to the server. In response to a search request, the query server interprets the request and produces the number of hits for the search terms together with the associated URLs for the information. Thus, the query server holds information on all documents of all Internet/intranet sites and can produce corresponding URLs after a search. However, a user may not have proper access level for all of the documents found. In accord with the present invention, the user sees only those documents for which he has proper access.

A typical web site 21 includes a web server 23 and a document storage device 25. The web server 23 is a high speed processor and the storage device 25 is a disk drive. An access control list server 27 may be stored on storage device 25 or may have its own auxiliary storage device, as indicated in FIG. 1. If a separate storage device is used, such as a disk drive, it is also controlled by the web server 23. The web site 21 communicates with other web sites, not shown, which are also on the network and joined by one or more communication links, such as data bus line 11. The storage device 25 holds electronic versions of documents which are available for searching and retrieval, but without any access control information.

In a corporate environment, the web site 21 may hold documents from the single plant or factory of a corporation. Other plants and factories have similar web sites which are all linked in a network known as an intranet. Access to documents is limited to persons who have proper authorization. Such authorization is maintained in the access control list server 27 associated with each web site. The list server 27 contains user IDs and the list of URLs or partial URLs that each user may access. In another example, corporate payroll record documents might be accessible to all department level managers and their supervisors, plus all members of the payroll and accounting departments. All other corporate employees would not have access to payroll records and so would be excluded from payroll documents available on storage device 25.

In operation, a user would send a query to search engine 15 which would interpret the query. An optional communications link 31 is provided to the access control list server 27 to determine whether the user may access web site 21 which has certain corporate documents in the search area under request. Assuming the user has initial access to the home page of web site 21 the search progresses by applying search terms to the index on storage device 17 which has pointers to text documents, such as URLs, found in the storage device 25 within web site 21. Assuming that payroll information is being requested and assuming that the payroll information is stored on storage device 25 which is accessed through the web server 23, the user identification is passed along to the web server 23. The web server 23 has access to the access control list server 27. The text index 17 has identified documents in storage device 25. The access control list server 27 prevents the web server 23 from delivering any documents where the user identification indicates that the user does not authorization. Only those documents are pulled up for which the user has authorization. Those documents are then reported by the web server 23 to the search engine 15 which, in turn, reports the titles or bibliographic abstracts to the user. It should be noted that the user does not know about records for which access has been denied by the access control list server 27.

It should also be noted that the full text index 17 has no access information. Similarly, the electronic document records in storage device 25 have no security labels or information. All security information is in the access control list server 27 which relates document titles in the text documents storage device 25, their access classification, plus user identification and the access level for each user.

EXAMPLE A

Figure 2:
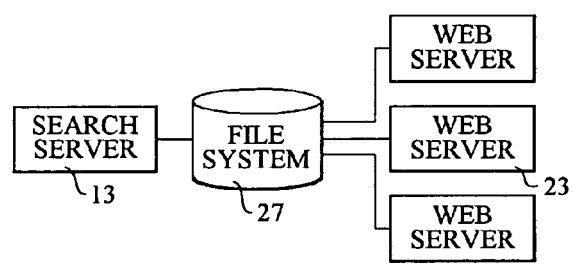
FIG. 2 is a plan view of a first embodiment of an access control system in accord with the present invention.

With reference to FIG. 2, a query server 13 has access to an access control list file which can be located anywhere, but is associated, as by a data link, with one or more web servers 23 that are indexed by the query server. The access control list has a list of all users of the system, together with a list of documents that each user is permitted to access. The access control list file may be local to the query server 13 or may be accessed remotely using a file transfer protocol (FTP). The query server uses its own filesystem file locator, 27, to access and interpret the access control list and calls up those documents in web servers 23 responsive to a search query for which the user has access. Only those documents are presented to a user.

EXAMPLE B

Figure 3:
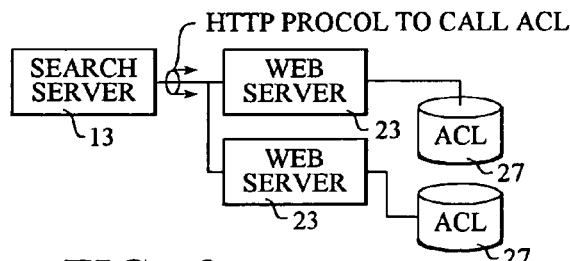
FIG. 3 is a plan view of a second embodiment of an access control system in accord with the present invention.

With reference to FIG. 3, the query server 13 accesses an access control list as in the prior example, except that HTTP protocol is used instead of using the filesystem or FTP.

A particular user, Mr. Jones, ID 71234, might need access to FBI cellular communication device numbers, including pagers and telephones. A query is sent to the query server which uses HTTP protocol to access each access control list file associated with each web server whose documents are contained in the index. His access control entry would be as follows:

71234=http://federalexec.justice.gov/fbi/agents/cellular/.

He might have other entries for other classes of documents, but this class of documents will relate to FBI cellular numbers, whether pagers, telephones, or other devices. A higher level of access would be as follows:

71324=http://federalexec.justice.gov/fbi/ and a lower level of access would be as follows:

71324=http://federalexec.justice.gov/fbi/agents/cellular/pagers.html.

In the latter case, Mr. Jones would not have access to cellular telephone numbers and the web server query server would not allow access to telephone numbers. In both cases, the access control file finds the user, 71324, but in the latter case, access is denied.

EXAMPLE C

Figure 4:
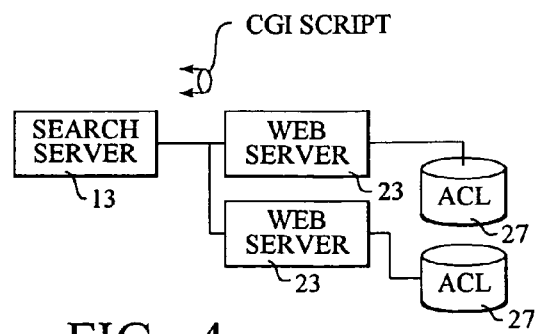
FIG. 4 is a plan view of a third embodiment of an access control system in accord with the present invention.

With reference to FIG. 4, the query server 13 is connected to a web server 23, as before, except that the web server is running a program, for example a search program, which is triggered or controlled from the query server by a communication, which invokes a script, batch file or executable instruction, generated by the query server and meaningful to the program on the web server where the requested document is located. Each web server whose words are indexed validates its own documents for particular users using a validation message. Such communications are known as "gateway scripts". Gateway scripts are sometimes called CGI scripts, where CGI is an acronym for Common Gateway Interface. A script may have a URL in HTTP format which controls or operates the program in the web server to execute a search query. The script can be resident in the web server and be invoked only by the URL transmitted by the query server. The search server transmits the user identification and list of candidate URLs that match the query and requests a CGI script to validate the list of URLs. The web server performs the validation and returns a list back to the search server indicating the URLs which the user is entitled to read in accord with his access level. Those documents which are beyond his access level are not reported to the user.

It is now possible to have a centralized index of documents found on multiple document servers, some or all of which may be remote. An access control list is associated with the index of documents. A search of the centralized index will report addresses, URLs, of various documents responsive to the search query. Since the access control list shows the URLs to which the user has access, only those titles to corresponding documents need to be shown to a user or fetched from a document server.

An advantage of the present invention is that changes in the access control list are immediately reflected in searches, because the list links authorized documents for each user identification code, sometimes using a hierarchical structure. In this manner, large categories of documents can be included or excluded from a search with a single file entry, such as a partial URL.

What is claimed is:

1. A method of document retrieval in a network environment having web sites where documents are stored with a plurality of access levels and query servers where document searches are launched comprising,
   executing a query on a query server having access to a document index of documents available for searching on document servers provided in the web site by a person having a unique identification code without regard to access control limitations, yielding a list of all relevant documents, each document having a unique URL,
   reviewing all URLs by the document servers after the search is executed using an access control list associated with each document server to check whether each URL is compatible with the access level of the identification code of the person executing the query,
   delivering only those URLs that are compatible with the access level of the person, wherein each URL that is not compatible with the access level of the person is withheld, and
   preventing the person from discovering the URLs that are not compatible with the access level of the person.

2. The method of claim 1 further defined by providing a data link between the query server and access control lists for associated web servers.

3. The method of claim 2 further defined by storing the access control list separately from the index of documents.

4. The method of claim 2 further defined by storing the access control list separately from the documents.

5. The method of claim 1 further defined by implementing access control with partial URLs indicating the hierarchy of documents to which a person with a unique identification code has access.

6. The method of claim 1 further defined by implementing access control with a common gateway interface script.

7. The method of claim 6 wherein said common gateway interface script returns a message to the query server indicating URLs to which a person with a unique identification code has access.

8. The method of claim 2 wherein a single access control list is provided for all document servers.

9. The method of claim 2 wherein an access control list is provided for each document server.

10. A method of document retrieval in a network environment having web sites where documents are stored and query servers where document searches are launched comprising,
    providing a plurality of document servers in the web sites, each having an association with a plurality of documents, each document identified with a unique URL, each document server having an access control list defining user identification and for each user identification listing URLs for which access is permitted or denied,
    executing a query on a query server having access to a document index of documents available for searching on the document servers by a person having one of said identification codes,
    determining by one of the document servers whether each URL is compatible with the access level of the identification code of the person; and
    producing only those documents whose URL is compatible with the access level of the identification code of the person, wherein each non-compatible URL is withheld.

11. The method of claim 10 wherein the URLs are expressed in HTTP protocol.

12. The method of claim 10 wherein each access control list lists URLs for each user identification number with a hierarchical indication of documents for which access is permitted or denied.

13. The method of claim 12 wherein said hierarchical indication of documents is by partial URLs.

14. The method of claim 10 further defined by accessing the access control list by the filesystem of the query server.

15. The method of claim 10 further defined by accessing the access control list by a file transfer protocol.

16. The method of claim 10 further defined by confirming access to the access control list by a script message from a document server.

* * * * *